US010481902B2

(12) United States Patent
Gschwind

(10) Patent No.: US 10,481,902 B2
(45) Date of Patent: *Nov. 19, 2019

(54) INITIALIZATION STATUS OF A REGISTER EMPLOYED AS A POINTER

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,280

(22) Filed: Dec. 8, 2017

(65) Prior Publication Data
US 2018/0101378 A1 Apr. 12, 2018

Related U.S. Application Data

(63) Continuation of application No. 14/941,577, filed on Nov. 14, 2015, now Pat. No. 9,880,835, which is a
(Continued)

(51) Int. Cl.
G06F 8/70 (2018.01)
G06F 8/54 (2018.01)
G06F 9/445 (2018.01)

(52) U.S. Cl.
CPC ............... G06F 8/70 (2013.01); G06F 8/54 (2013.01); G06F 9/44521 (2013.01)

(58) Field of Classification Search
CPC ........... G06F 8/70; G06F 8/54; G06F 9/44521
(Continued)

(56) References Cited

U.S. PATENT DOCUMENTS 5,822,787 A 10/1998 Zucker
2008/0077973 A1 3/2008 Zimmer
(Continued)

OTHER PUBLICATIONS

IBM, "A Method for Dynamic Linking and Contextual Extension of Independent Systems," IP.com No. 000020583, Nov. 2003, pp. 1-3 (+ cover).
(Continued)

Primary Examiner — Emerson C Puente
Assistant Examiner — Sen Thong Chen
(74) Attorney, Agent, or Firm — Steven Chiu, Esq.; Blanche E. Schiller, Esq.; Heslin Rothenberg Farley & Mesiti P.C.

(57) ABSTRACT

Initialization status of a register to be used as a pointer to a reference data structure is used to determine how a stub is to be generated to access the reference data structure. The register is one type of pointer configuration to be used to access the reference data structure, which is used to resolve a symbol associated with a function of a program. An indication is obtained as to whether the register has been initialized with a reference data structure pointer. Based on obtaining the indication, a stub is generated that is to be used to access the function. The generating depends on whether the register has been initialized. If the register has not been initialized, then the stub is generated to include another type of pointer configuration to be used to access the reference data structure.

20 Claims, 11 Drawing Sheets

Related U.S. Application Data continuation of application No. 14/755,335, filed on Jun. 30, 2015, now Pat. No. 9,880,833.

(58) Field of Classification Search
USPC .......................................................... 717/140
See application file for complete search history.

(56) References Cited

U.S. PATENT DOCUMENTS

| | | | |
|---|---|---|---|
| 2013/0086369 A1 | 4/2013 | Blainey et al. | |
| 2013/0263153 A1* | 10/2013 | Gschwind | G06F 9/4484 719/313 |
| 2013/0318282 A1* | 11/2013 | Wakutsu | G06F 12/0246 711/102 |
| 2014/0101677 A1 | 4/2014 | Gschwind | |
| 2014/0351804 A1 | 11/2014 | Mencias et al. | |
| 2015/0205612 A1* | 7/2015 | Jackson | G06F 9/30138 712/216 |
| 2016/0179545 A1* | 6/2016 | Garifullin | G06F 9/384 712/205 |
| 2017/0003941 A1 | 1/2017 | Gschwind et al. | |
| 2017/0003942 A1 | 1/2017 | Gschwind et al. | |

OTHER PUBLICATIONS

IBM, "A Mechanism for Embedding Live Content from Linked Hierarchical Model Files," IP.com No. 000154180, Jun. 2007, pp. 1-6 (+ cover).

IBM, "z/Architecture—Principles of Operation," IBM Publication No. SA22-7832-10, Eleventh Edition, Mar. 2015, pp. 1-1732.

IBM, "Power ISA—V2.07B," Apr. 2015, pp. 1-1527.

Mel, Peter and Tim Grance, "The NIST Definition of Cloud Computing," National Institute of Standards and Technology, Information Technology Laboratory, Special Publication 800-145, Sep. 2011, pp. 1-7.

List of IBM Patents or Patent Applications Treated as Related, Dec. 8, 2017, 2 pages.

* cited by examiner

INITIALIZATION STATUS OF A REGISTER EMPLOYED AS A POINTER

CROSS-REFERENCE TO RELATED APPLICATIONS

This application is a continuation of co-pending U.S. patent application Ser. No. 14/941,577, filed Nov. 14, 2015, entitled "INITIALIZATION STATUS OF A REGISTER EMPLOYED AS A POINTER," which is a continuation of U.S. patent application Ser. No. 14/755,335, filed Jun. 30, 2015, entitled "INITIALIZATION STATUS OF A REGISTER EMPLOYED AS A POINTER," each of which is hereby incorporated herein by reference in its entirety.

BACKGROUND

One or more aspects relate, in general, to computer processing, and in particular, to facilitating processing associated with reference data structures used in computer processing.

A program development cycle of a typical application program includes writing source code, compiling the source code into object files, building shared libraries, and linking of the object files into a main executable program. Additional preparation, including loading of the main executable program and loading of the shared libraries for application start-up, occurs before the application is executed on a particular hardware platform.

A compiler works on a single source file at a time to generate object files. The compiler generates object code without knowing the final address or displacement of the code/data. Specifically, the compiler generates object code that will access a variable address reference data structure, referred to herein as a reference data structure, for variable values without knowing the final size of the reference data structure or offsets/addresses of various data sections. Placeholders for this information are left in the object code and updated by a linker. One example of a variable address reference data structure is a Table of Contents (TOC) that is utilized, for example, in an AIX (Advanced Interactive eXecutive) environment offered by International Business Machines Corporation, to access program variables in a manner that supports shared libraries and is data location independent. A similar structure, referred to as a Global Offset Table (GOT), performs a similar function (e.g., access to variables) in a Linux environment.

The linker collects object files into executable programs/shared objects and assigns offsets to code/data. The linker resolves internal references during program development, collects the reference data structure (e.g., TOC/GOT) entries from object files, assigns reference data structure offsets, and generates the reference data structure section. The linker knows the final size of the reference data structure, but does not perform major edits to reference data structure access code sequences generated by the compiler. The linker knows the offsets for specific internal reference data structure entries, but does not know the final resolved values for most external reference data structure entries. The external reference data structure entries are resolved by the loader/dynamic linker at, for instance, load time.

A reference data structure is accessed by a pointer and that pointer may be loaded in a register. That is, a register is initialized with an address used to access the reference data structure. This initialization of the register and/or processing associated therewith is expensive in terms of processing cycles and/or performance, especially since initialization is performed for each module, and therefore, performed frequently. However, some modules may not require the use of a reference data structure pointer and/or of the pointer register, and therefore, initialization of the register may be performed needlessly.

Yet further, it may not be known whether the pointer is needed, and therefore, if the register is not initialized, it may not be available if needed (e.g., by a procedural link table (PLT) stub typically used in linking to external functions).

SUMMARY

Based on the foregoing, a need exists for facilitating processing associated with the use of reference data structure pointers and/or registers that include those pointers. A further need exists for facilitating processing associated with generating PLT stubs that may or may not use those registers. A need exists for improving computer performance related to using reference data structures.

In accordance with an aspect of the present invention, initialization status of a register to be used to access a reference data structure is used in the generation of a PLT stub. For instance, if a reference data structure pointer register has been initialized in that a reference data structure pointer is included in the register, then the PLT stub may be generated to include the register. Similarly, if the reference data structure pointer register has not been initialized, then the PLT stub may be generated without including the register.

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes obtaining, by a processor, an indication of whether a register has been initialized with a reference data structure pointer. The register is one type of pointer configuration to be used to access a reference data structure to be used to resolve a symbol associated with a function of a program. Based on obtaining the indication, a stub is generated to be used to access the function. The generating depends on whether the indication indicates the register has been initialized. Based on the indication indicating the register has not been initialized, the generating includes generating the stub to include another type of pointer configuration to be used to access the reference data structure, the other type of pointer configuration being different from the one type of pointer configuration.

This advantageously enables a stub to be generated without relying on the register when the initialization status indicates the reference data structure pointer register has not been initialized. This improves performance within the computing environment by not requiring expensive initialization of the reference data structure pointer register and/or associated processing, if not needed.

In one embodiment, the other type of pointer configuration is a non-register pointer configuration. As an example, the other type of pointer configuration includes using a value, the value not being stored in a register to be used to access the reference data structure. The value includes one of a program counter, a current address, an absolute address, or an address of the program module calling the function. Again, this advantageously enables the stub to be generated without using the pointer register; thus, improving performance and reducing costs.

In one aspect, the generating the stub includes generating the stub absent a store instruction to store the reference data structure pointer. In another aspect, based on the indication indicating the register has not been initialized, a restoration of the register is avoided. This advantageously avoids executing instructions and performing processing that is unneeded and improves performance.

In yet a further aspect, the generating the stub further includes determining whether pc-relative addressing is to be used to access the reference data structure; and based on determining pc-relative addressing is to be used to access the reference data structure, the other pointer configuration includes a program counter value to access the reference data structure. This is advantageous for those systems that use pc-relative addressing and may eliminate the need to perform processing associated with the pointer register that may not be needed.

In one aspect, the indication of whether the register has been initialized is provided by a relocation command associated with the symbol to be resolved. As an example, one value of the relocation command indicates the register is initialized, and another value of the relocation command indicates the register is uninitialized. Advantageously, a new type of relocation command specifies whether the register is initialized, and allows processing to be performed based on the initialization status of the register.

In yet a further aspect, based on the indication indicating the register has been initialized, the generating the stub includes generating the stub to include the register.

Computer-implemented methods and systems relating to one or more additional aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing, as well as features and advantages of one or more aspects, are apparent from the following detailed description taken in conjunction with the accompanying drawings in which:

DETAILED DESCRIPTION

In accordance with one or more aspects, a capability is provided to obtain initialization status of a register to include a reference data structure (e.g., GOT or TOC) pointer (referred to herein as a reference data structure pointer register, register, and/or pointer register), and to use this status to generate an appropriate stub (e.g., a procedural link table (PLT) stub) to be used to link to an external function. This advantageously enables a stub to be generated without relying on the register when the initialization status indicates the reference data structure pointer register has not been initialized. This improves performance within the computing environment by not requiring the expensive initialization of the reference data structure pointer register and associated processing, if not needed.

Figure 1:
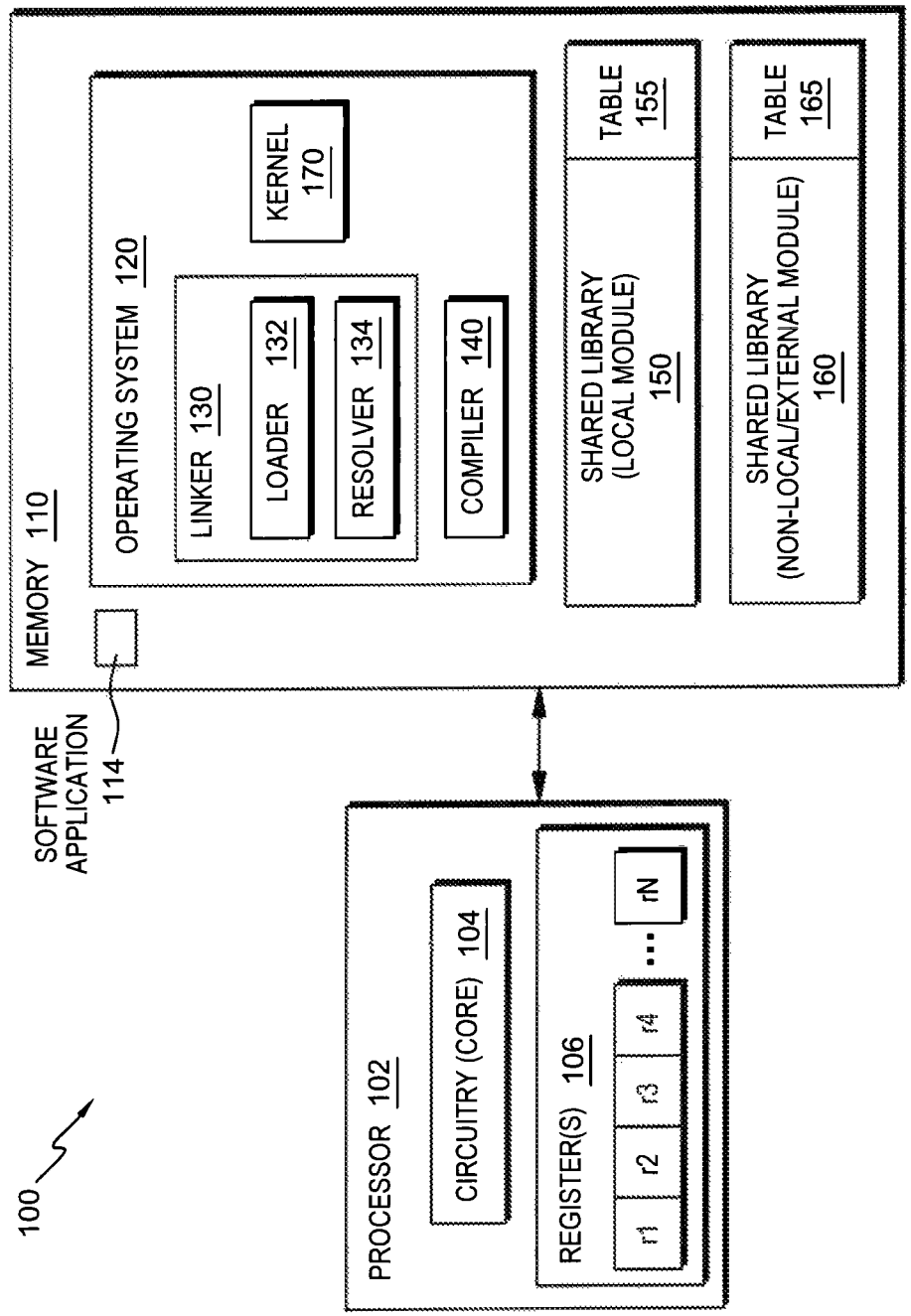
FIG. 1 depicts one example of a computing environment to incorporate and use one or more aspects.

One embodiment of a computing environment to incorporate and use one or more aspects is described with reference to FIG. 1. A computing environment 100 includes, for instance, a processor 102 (e.g., a central processing unit (CPU)) that has one or more processor cores, and each processor core may be referred to as circuitry 104. Processor 102 may include one or more registers 106, and each register is a small amount of storage available as part of a CPU or other digital processor. Data may be loaded into a register 106 from memory 110 for arithmetic manipulation by circuitry 104. Registers 106 are individually labeled as register 1 (r1) through register N (rN).

Memory 110 may include one or more software applications 114 with program logic to perform various operations, and it may include an operating system 120. Operating system 120 may include a dynamic linker 130 with a loader 132 and a resolver 134. Dynamic linker 130 is the part of the operating system that loads (via loader 132) and links (via resolver 134) shared libraries (e.g., shared library 150 and/or shared library 160) for an executable (e.g., instructions of, e.g., a software application 114) when the executable is executed. The specific operating system and executable format determine how the dynamic linker functions and how it is implemented. Linking is often referred to as a process that is performed at compile time (by compiler 140) of the executable, while a dynamic linker is in actuality a special loader that loads external shared libraries (e.g., shared library 160) into a running process and then binds those shared libraries dynamically to the running process of the processor.

In one embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. In one example, the processor executes an operating system, such as AIX, also offered by International Business Machines Corporation. POWER ARCHITECTURE® and AIX® are registered trademarks of International Business Machines Corporation, Armonk, N.Y., USA. Other names used herein may be registered trademarks, trademarks, or product names of International Business Machines Corporation or other companies.

In another example, processor 102 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-10, Eleventh Edition, March 2015, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor 102 is based on an Intel architecture offered by Intel Corporation. Intel® is a registered trademark of Intel Corporation, Santa Clara, Calif. Yet further, processor 102 may be based on other architectures. The architectures, severs, systems and/or operating systems mentioned herein are merely provided as examples.

Figure 2A:
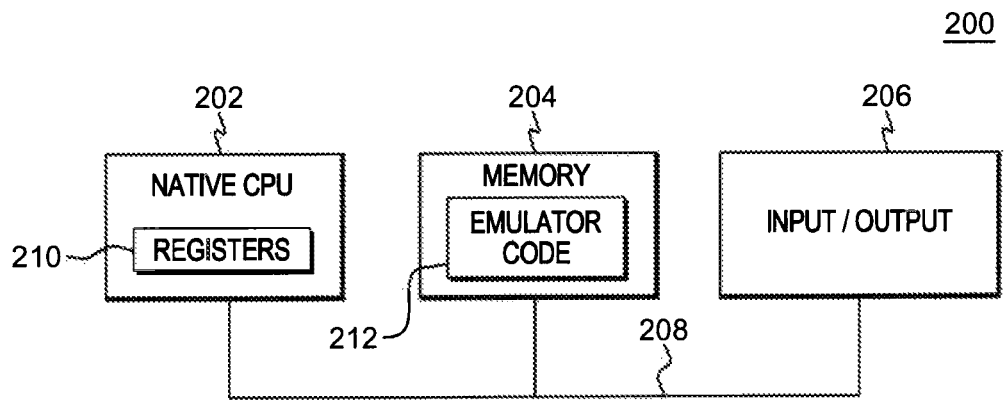
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
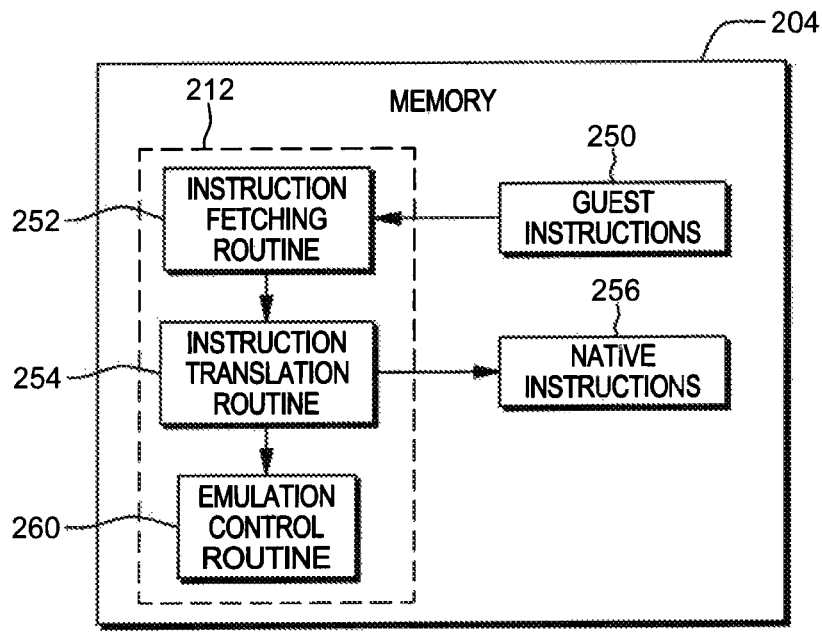
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 is obtained, translated and executed. The instruction, which is of one architecture (e.g., the Power architecture or z/Architecture), is fetched from memory, translated and represented as a sequence of native instructions 256 of another architecture (e.g., the z/Architecture, Power architecture, Intel architecture, etc.). These native instructions are then executed.

Each computing environment may execute application programs, and those programs may call external functions, such as a print routine, an arithmetic function, etc. Calls to external functions may employ a stub. A stub is a small program routine that substitutes for a longer program, possibly to be loaded later or that is located remotely. A stub may be used for a variety of reasons. For example, a method stub or simply stub is a piece of code used to stand-in for some other programming functionality (such as, e.g., a called function). A stub may simulate the behavior of existing code (such as a procedure on a remote machine) or may be a temporary substitute for yet-to-be-developed code. Generating a stub is common to operating systems supporting shared libraries. In one embodiment, such as for the AIX operating system, the stub is referred to as a procedural link table (PLT) stub. However, this is only one example.

Figure 3:
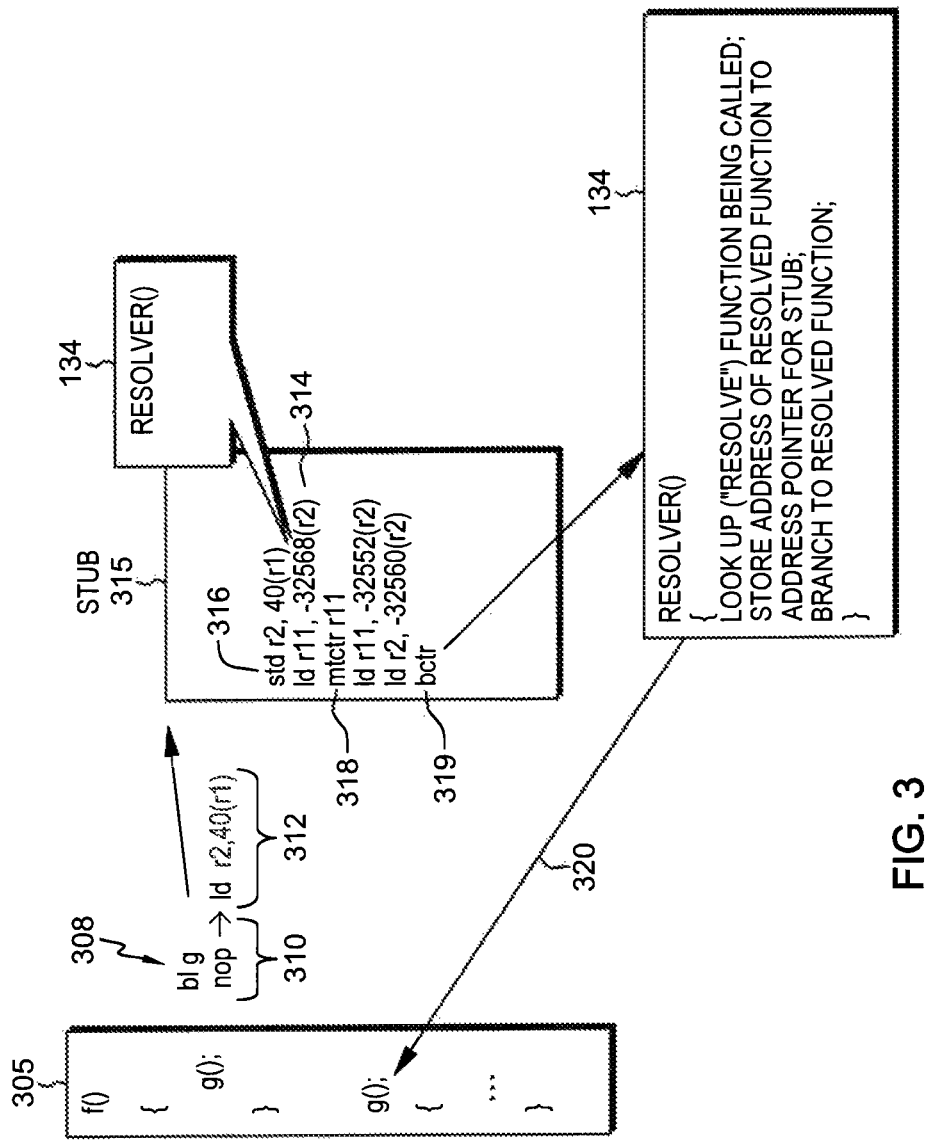
FIG. 3 depicts one example of processing utilizing a procedural link table stub, in accordance with one or more aspects.

One example of using a stub is described with reference to FIG. 3. In FIG. 3, a portion of code 305, which is part of a software application 114, includes a function f( ) that calls another function g( ) During compile time, compiler 140 processes function f( ) calling function g( ), and generates instructions 308, which include, for instance, a branch and link instruction to function g( ) by followed by a no operation (nop) instruction 310. Instructions 308 generated by compiler 140 during compile time initially instruct a static linker to link to a symbol "g". The name of symbol "g" is provided to the linker by way of relocation information, e.g., a special relocation command specifying the name of the symbol, and instructions to the linker on how to adapt the symbol value in order to update the branch and link instruction with the address corresponding to the value of symbol g determined by the linker. For example, for the Power ISA (Instruction Set Architecture), the branch and link instruction takes a pc-relative offset, and this is indicated by an example relocation command R_PPC_ADDR24 indicating that the address of g is to be expressed as a 24-bit pc-relative address inserted in the instruction to which the relocation corresponds.

When symbol g cannot be found by the linker in the present module, the linker generates a call to resolver (dynamic linker) 134 to resolve the called function g( ) (which was not initially provided in code 305) at runtime to a definition in a dynamically loaded shared library by utilizing a stub 315. Stub 315, as well as a load instruction 312, is generated by the static linker in accordance with one or more application binary interfaces (ABIs).

An application binary interface (ABI) describes the low-level interface between an application program and the operating system or between the application program and another application. The ABI covers details, such as data type, size and alignment; the calling conventions which control how function arguments are passed and how return values are retrieved; the system call numbers and how an application should make system calls to the operating system; and in the case of a complete operating system ABI, the binary format of object files, program libraries and so on. Several ABIs (e.g., the interactive Unix ABI allowing a wide range of programs to run on a variety of Unix and Linux variants for the Intel x86 architecture) allow an application program from one operating system supporting that ABI to run without modifications on any other such system, provided that necessary shared libraries are present, and similar prerequisites are fulfilled.

During runtime when performing dynamic linking, resolver 134 of linker 130 is called by stub 315 (via a load instruction 314 obtaining an address to which to transfer control in conjunction with a reference data structure pointer), and the address pointer corresponding to load instruction 314 is write-updated by resolver 134 to replace the contents of the corresponding data location with the address of the resolved function (and specifically g( ) in the present example) so as to cause stub 315 to directly transfer control to function g( ) upon future invocations. That is, upon future invocations, stub 315 directly transfers control to function g( ) in a dynamic shared library—at an address determined by having resolver 134 perform name resolution to locate the address of the called function g( ).

Resolver 134 first performs a look up in tables 155 and 165 (FIG. 1) to obtain the proper function g( ) and the address of function g( ). Resolver 134 follows the six instructions in stub 315 (which may be another sequence and/or number of instructions in other operating systems) to obtain and read the called function g( ). Resolver 134 then provides (line 320) the subroutine for the called function g( ) to the piece of code 305. On subsequent executions of code 305, the subroutine for the called function g( ) may be used without requiring resolver 134 to look up and determine (resolve) function g( ) for code 305. Instead, in one embodiment, load instruction 314 may retrieve the address directly from the procedure linkage table (PLT) located in the reference data structure (e.g., the GOT or the TOC). In another embodiment, the address of the PLT may not be a part of the reference data structure but stored at a predetermined offset from the reference data structure. In yet another embodiment, the address of the PLT may be obtained from the reference data structure.

In one embodiment, the PLT stub assumes that a pointer to a reference data structure (e.g., GOT/TOC) is initialized in, for instance, a general purpose register, r2. Thus, in generating the PLT stub, a store instruction 316 is included in the stub, and the register is used to locate the address of function g( ). The address of function g( ) is then loaded into another register using load instruction 314. The contents of the register loaded by load instruction 314 are moved to a counter register using a move instruction 318, and then a branch instruction 319 is used to branch to the counter register to obtain the address of function g( ).

The use of the store instruction and associated processing as they relate to a reference data structure pointer register are further described with reference to FIG. 4. In this example, a symbol to be resolved is for a print function. In particular, the symbol (e.g., printf) is resolved to determine the address of the print function. As depicted, a branch and link print function (BL printf) 401 is preceded by an instruction 400 to initialize a register, r2, to a value to be used as a pointer to a reference data structure. In one embodiment, the instruction is an instruction adding an offset to a known value, e.g., an add instruction to a register holding the function entry address ("addi r2, r12, (TOC-.)") or to a program counter ("addpci r2, pc, (TOC-.)"). In another embodiment, this address may be obtained with a z/Architecture load address relative instruction, e.g., with the Load Address Relative Long (LARL) instruction "LARL r2, TOC-.". In some embodiments, this computation may be performed by a plurality of RISC (Reduced Instruction Set Computing) or CISC (Complex Instruction Set Computing) instructions. In yet other embodiments, the address may be obtained by loading it from a memory location.

Figure 4:
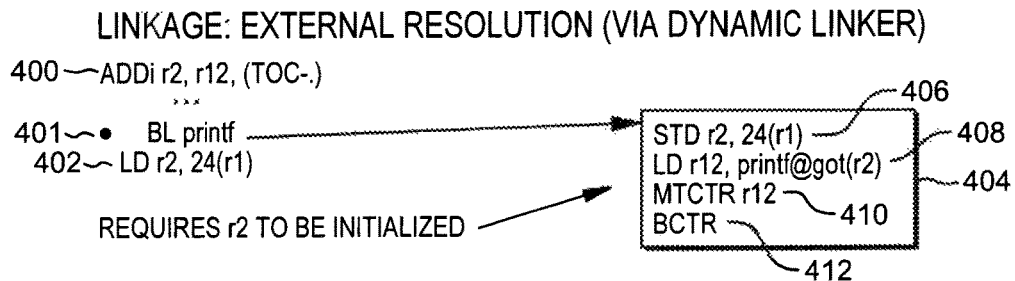
FIG. 4 depicts one example of code associated with external resolution that uses a reference data structure pointer register to access a reference data structure, in accordance with one or more aspects.

As shown in FIG. 4, in at least one embodiment, the branch and link instruction 401 has associated therewith a load (LD) instruction 402 that is used to restore a pointer to the reference data structure in register, r2, upon return from a subroutine call. Each calling module (i.e., the module calling the print function or another function) has its own reference data structure, so the pointer to the reference data structure is specific to the calling module.

In stub 404, a store is performed of the contents of r2, in which the pointer is saved on a stack (406) so as to enable instruction 402 to retrieve and restore the value therefrom; the address of the printf function obtained from the reference data structure pointed to by r2 is loaded in r12 (408); and then a move to a counter register of the address in r12 (410) and a branch to that address to access the printf function (412) are performed. Thus, as shown, the reference data structure pointer is first included in a register (e.g., r2) and then it is stored. Further, in one or more embodiments, it is also restored. Performing these steps is expensive, especially since they are performed for many functions. Further, it is unknown to the compiler whether a function may be resolved locally (obviating the need to initialize a data reference structure pointer in many cases) or whether the linker will insert a PLT stub to resolve a symbol at runtime (thus, using an initialized data reference structure pointer).

Therefore, in accordance with an aspect of the present invention, the PLT stub does not assume the pointer is in a general purpose register, but instead, uses initialization status information relating to the pointer register to make a decision as to whether the pointer register is to be included in the stub. This decision, in one embodiment, is based on a relocation command associated with a relocation attached to the object code generated by the assembler for the function, e.g., the printf function. For instance, when the assembler generates object code for the BL printf instruction, it provides BL 0x000000, in which the zeros are a placeholder for the address of the printf function, and it further provides a relocation command to the linker to insert a resolved address and a symbol to be resolved which represents printf. For example, the relocation command may be, for instance, R_PPC64_ADDR24 and the symbol may be printf, which indicates the address of printf is to be resolved and inserted as a 24b offset, in this example. Although this particular relocation command and/or symbol are provided, many variations are possible. This is only one example of a relocation command and/or symbol to be used for one function, in one particular architecture (Power); however, other relocation commands and/or symbols may be used for this architecture or for this function, as well as for other architectures and/or other functions. Many variations are possible.

In accordance with one or more aspects, a new type of relocation command for each function (or a subset thereof) is introduced that identifies a relocation command for a function subroutine call, while further indicating that the reference data structure pointer register has not been initialized by the calling function (e.g., NOGOT/NOTOC, etc). In accordance with one embodiment, when a call to a relocation command is specified that may employ an invocation via a PLT to perform a cross-module call, a new relocation command (e.g., R_PPC64_ADDR24_NOGOT or other commands for other symbols/functions) may be used that has the same semantics as its counterpart (e.g., R_PPC64_ADDR24); however, it further indicates that the pointer register has not been initialized (e.g., NOGOT).

Thus, like R_PPC64_ADDR24, with R_PPC64_ADDR24_NOGOT, a call to the specified relocation command will be created when the call is within a module, and a call is made to a PLT stub which in turn causes a procedure linkage table entry to be loaded from the PLT area of the GOT corresponding to the specified symbol. However, unlike R_PPC64_ADDR24, when R_PPC64_ADDR24_NOGOT is specified, the linker is instructed to generate a PLT stub sequence not relying on an initialized reference data structure pointer register. In at least one embodiment, the linker is further instructed to not modify the pointer register.

Figure 5:
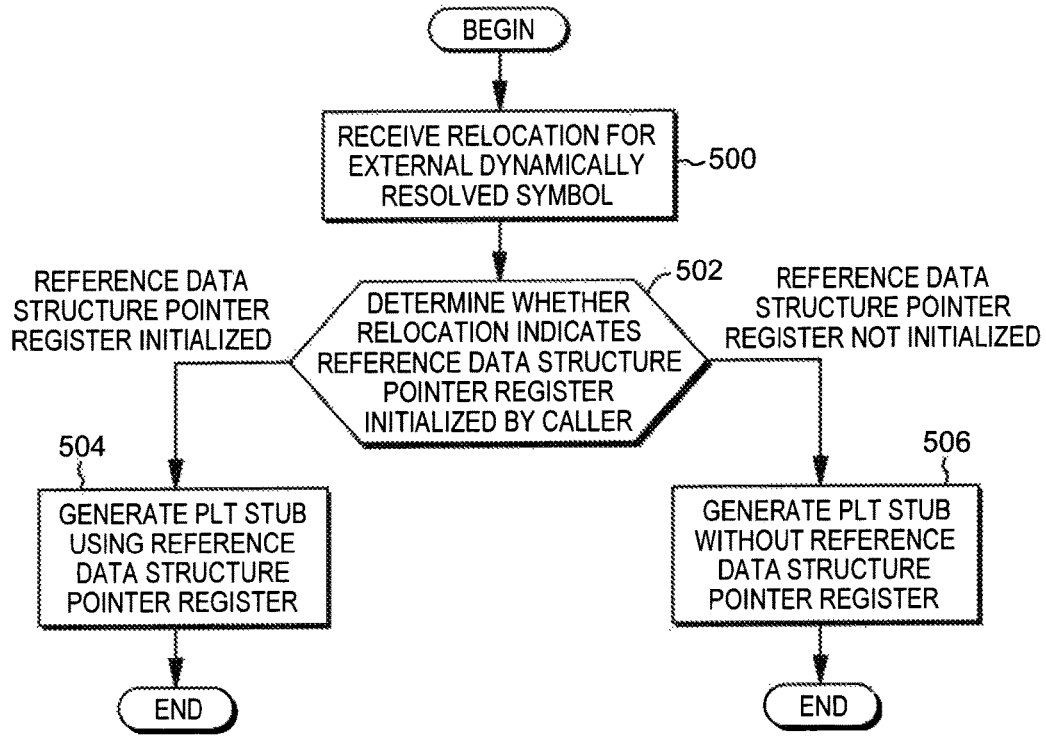
FIG. 5 depicts one example of logic associated with generating a stub based on initialization status of a reference data structure pointer register, in accordance with one or more aspects.

One embodiment of logic associated with using initialization status of a reference data structure pointer register to determine whether a reference data structure pointer register is to be included in a stub is described with reference to FIG. 5. This logic is invoked, for instance, when a reference to a function (e.g., g( ) printf, or another function) cannot be resolved within the local module at static link time, either because the symbol is not defined in the module, or the name resolution rules require the symbol to be resolved at runtime.

In one example, the static linker that binds the module calling the function receives a relocation for an external dynamically resolved symbol, STEP 500. Based on receiving the relocation, including a relocation command associated with the function symbol, the linker determines whether the relocation indicates a reference data structure pointer register is initialized by the caller, INQUIRY 502. In one example, the linker makes this determination based on the received relocation command (e.g., R_PPC64_ADDR24 versus R_PPC64_ADDR24_NOGOT). If the reference data structure pointer register is initialized, then a PLT stub is generated using the reference data structure pointer register, STEP 504. Otherwise, if the reference data structure pointer register is not initialized, then the PLT stub is generated without the reference data structure pointer register, STEP 506. That is, the stub may be generated without including the store of the reference data structure pointer register and/or without any reference to the register.

Figure 6A:
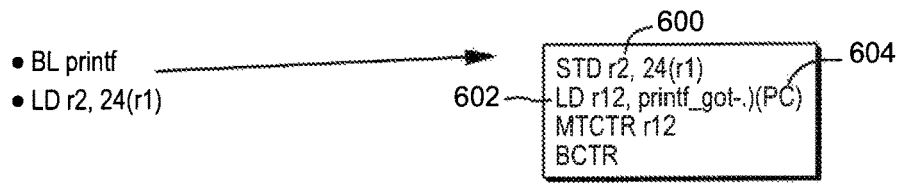
FIG. 6A depicts one example of code associated with external resolution that uses pc-relative addressing to access a reference data structure, instead of a reference data structure pointer register, in accordance with one or more aspects.
Figure 6B:
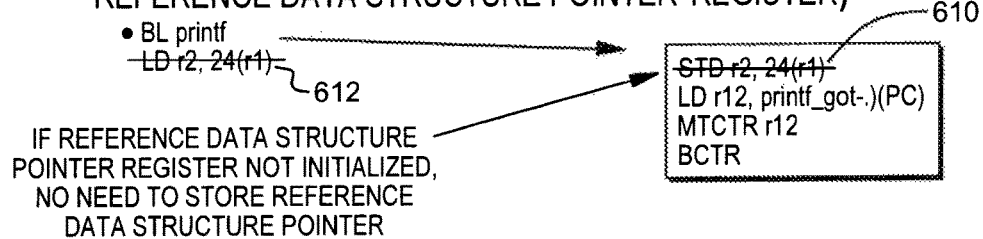
FIG. 6B further depicts one example of the code of FIG. 6A illustrating that the reference data structure pointer register is not needed by the caller and consequently does not save or restore the reference data structure pointer register, since pc-relative addressing is being used to access the reference data structure, in accordance with one or more aspects.
Figure 6C:
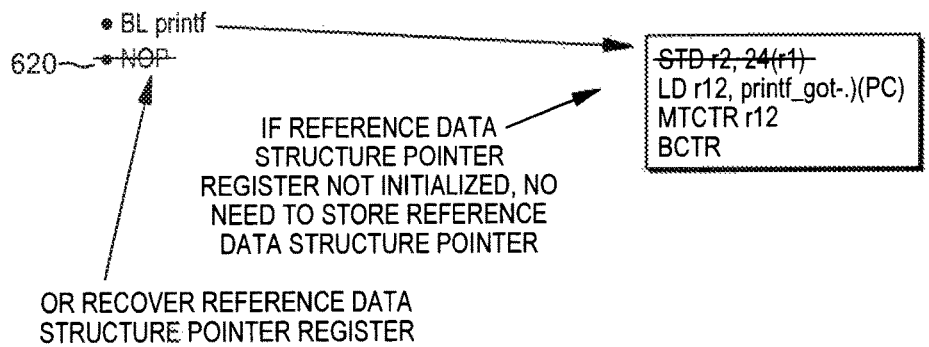
FIG. 6C further depicts one example of the code of FIG. 6B illustrating that recovery of the reference data structure pointer register is not needed by the caller and consequently does not save or restore the reference data structure pointer register, and further including suppressing generating a restore slot after a subroutine call, in accordance with one or more aspects.
Figure 7:
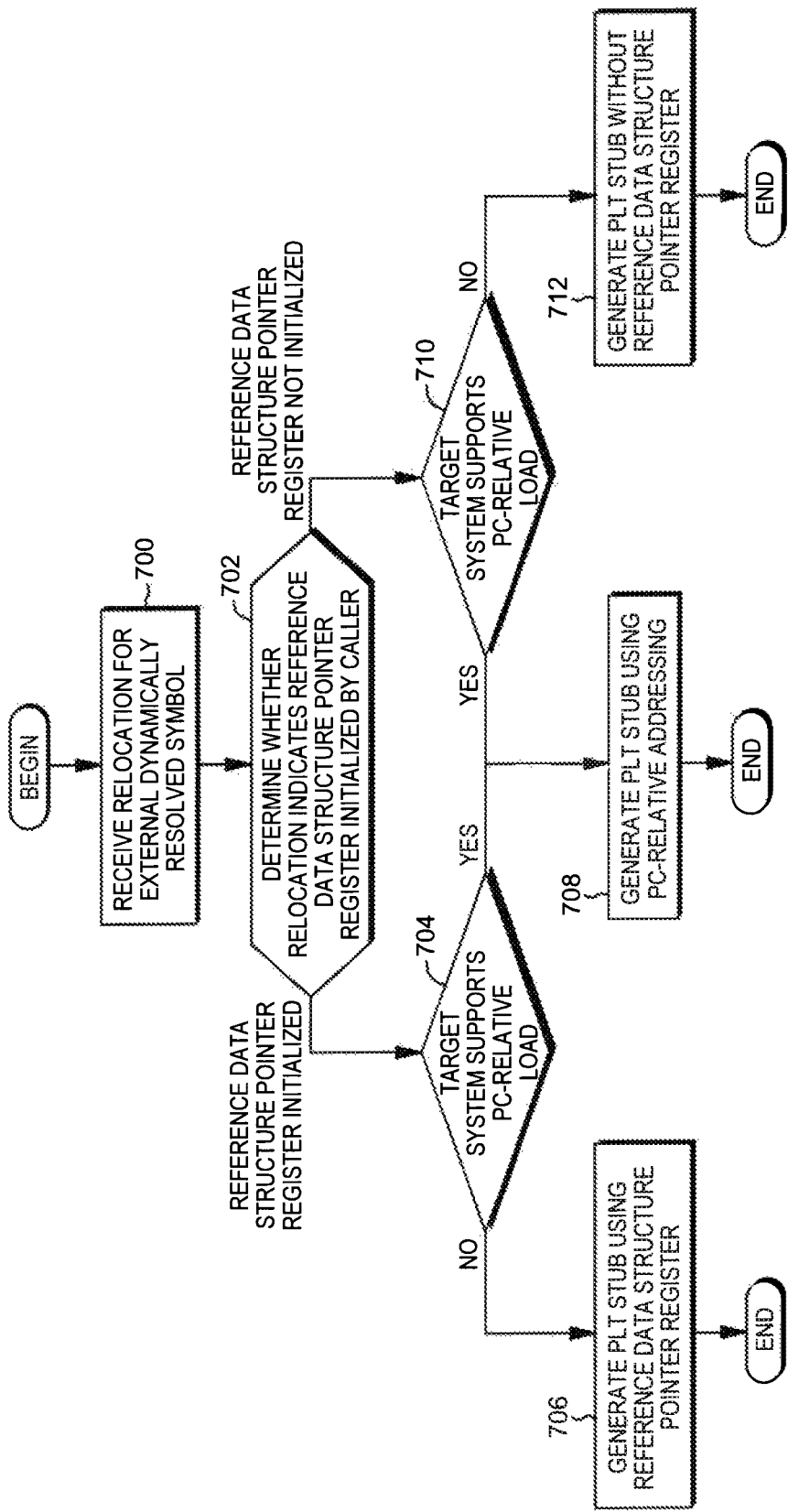
FIG. 7 depicts one embodiment of logic associated with resolving a symbol, in accordance with one or more aspects.

Further, in accordance with another embodiment, pc-relative addressing may be used to access the reference data structure, instead of using a pointer stored in a register. Pc-relative addressing generates an address by using the value of the program counter (PC) plus an offset (positive or negative). One example of using pc-relative addressing, instead of a reference data structure pointer register, to find the address of an external function, is described with reference to the example code in FIG. 6A. In this example, instead of using r2 (600) in the LD r12 instruction (602), the code uses a program counter (PC) 604. That is, the reference data structure is referenced using the PC instead of the contents of r2. Thus, as shown in FIG. 6B, if the program counter is to be used, then in one embodiment, the reference data structure pointer may not be initialized, and there may be no need to perform the store r2 (610) instruction nor to restore (612) its value upon return to the calling module. Further, as shown in FIG. 6C, as there may be no need to recover the reference data structure pointer register, a placeholder NOP instruction (620) that may be replaced by the linker with a load r2 instruction restoring the data reference structure—as shown with reference to element 310 (FIG. 3) being replaced with element 312, is not needed. This saves the cost of executing the LD r2 and the STD r2 instructions, as well as associated processing.

One embodiment of logic associated with using pc-relative addressing to access a reference data structure to resolve a name/function is described with reference to FIG.

7. In one example, the static linker that binds the module calling the function receives a relocation, including a relocation command, for an external dynamically resolved symbol, STEP 700. Based on receiving the relocation, the linker determines via, for instance, the relocation command (i.e., the value of the relocation command, e.g., R_PPC_ADDDR24 or R_PPC64_ADDR24_NOGOT), whether relocation indicates a reference data structure pointer register has been initialized by the caller, INQUIRY 702. If the reference data structure pointer register is initialized, then a further determination is made as to whether the target system (i.e., the system maintaining the reference data structure) supports pc-relative load, INQUIRY 704. If the target system does not support pc-relative load, then a PLT stub is generated using the reference data structure pointer register, STEP 706. That is, the load instruction in the stub referencing the pointer includes r2, and in at least one embodiment, a store r2 instruction is also included in the stub.

However, if the target system supports pc-relative load, INQUIRY 704, then the PLT stub is generated using pc-relative addressing, STEP 708. This stub may also include, in one example, the store r2 instruction, since the relocation command indicates the pointer is initialized; however, the load instruction referencing the pointer includes the program counter, instead of r2.

Returning to INQUIRY 702, if the relocation indicates a reference data structure pointer register is not initialized (e.g., NOGOT/NOTOC, etc.), then the linker makes a further determination as to whether the target system supports pc-relative load, INQUIRY 710. If pc-relative addressing is supported, processing continues at STEP 708 in which the PLT stub is generated using pc-relative addressing. However, in this case, in one example, the stub does not include the store r2 instruction, since the relocation command indicates that the pointer register is not initialized.

Further, if the target system does not support pc-relative addressing, INQUIRY 710, and the pointer is not initialized, INQUIRY 702, then the PLT stub is generated without the program counter or the reference data structure pointer register, STEP 712. In this example, since neither the pointer register nor the program counter is to be used, the linker is to include another address to be used to access the reference data structure. As examples, the address may be the current address or a return address from the module calling the function (if there is only one caller, in this example). In a further embodiment, when multiple call sites to the PLT stub are present, the PLT stub may be cloned and a separate PLT stub version may be provided for each call site, or an alternate PLT stub sequence may be generated.

In yet another embodiment, the linker may generate a PLT stub using an absolute address in step 708, e.g., when the module is a statically linked module which has a known load address, such as the main module of a program. In at least one embodiment, INQUIRY 704 and INQUIRY 710 are modified correspondingly to determine whether an absolute address may be used.

By generating stubs based on initialization status, performance is enhanced by avoiding execution of unnecessary instructions and/or associated processing when the pointer register is not initialized.

Figure 8:
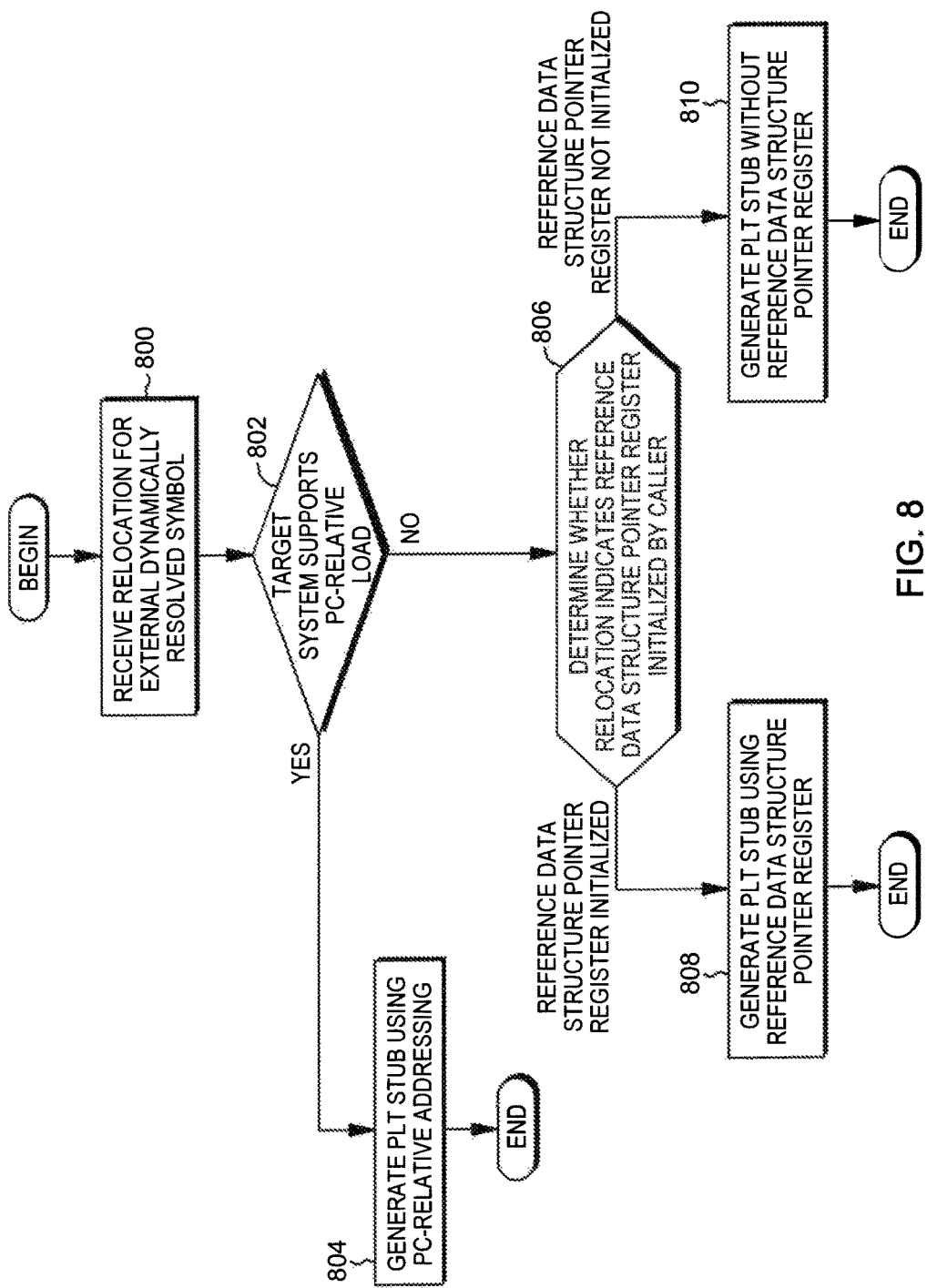
FIG. 8 depicts another embodiment of logic associated with resolving a symbol, in accordance with one or more aspects.

Another embodiment of logic associated with using pc-relative addressing is described with reference to FIG. 8. In one example, the static linker receives a relocation, including a relocation command, for an external dynamically resolved symbol, STEP 800. Based on receiving the relocation, the linker determines whether the target system supports pc-relative load, INQUIRY 802. If the target system supports pc-relative load, then a PLT stub is generated using pc-relative addressing, STEP 804. In this embodiment, since pc-relative addressing is supported, the stub is created using a program counter to access the reference data structure and the stub does not include the pointer register regardless of whether the pointer register is initialized.

Returning to INQUIRY 802, if the target system does not support pc-relative addressing, then a determination is made as to whether the relocation indicates a reference data structure pointer register has been initialized by the caller (e.g., via the relocation command), INQUIRY 806. If a pointer register is initialized, then a PLT stub is generated using the reference data structure pointer register, STEP 808. Otherwise, a PLT stub is generated without the reference data structure pointer register, STEP 810. Again, in this example, since pc-relative addressing is not supported either, the linker is to include another address to be used to access the reference data structure.

In yet another embodiment, the linker may generate a PLT stub using an absolute address in step 804, e.g., when the module is a statically linked module which has a known load address, such as the main module of a program. In at least one embodiment, INQUIRY 802 is modified correspondingly to determine whether an absolute address may be used.

As described herein, in one embodiment, a variety of relocation entries may be defined to have a NOGOT/NOTOC variant to indicate the absence of an initialized reference data structure (e.g., GOT or TOC) pointer for relocation types commonly used to specify the starting address of functions in subroutine calls.

In accordance with one or more aspects, when a subroutine is called that requires a PLT call, and the absence of an initialized reference data structure pointer register is indicated, a linker generates a PLT stub not relying on an initialized reference data structure pointer register.

Figure 9:
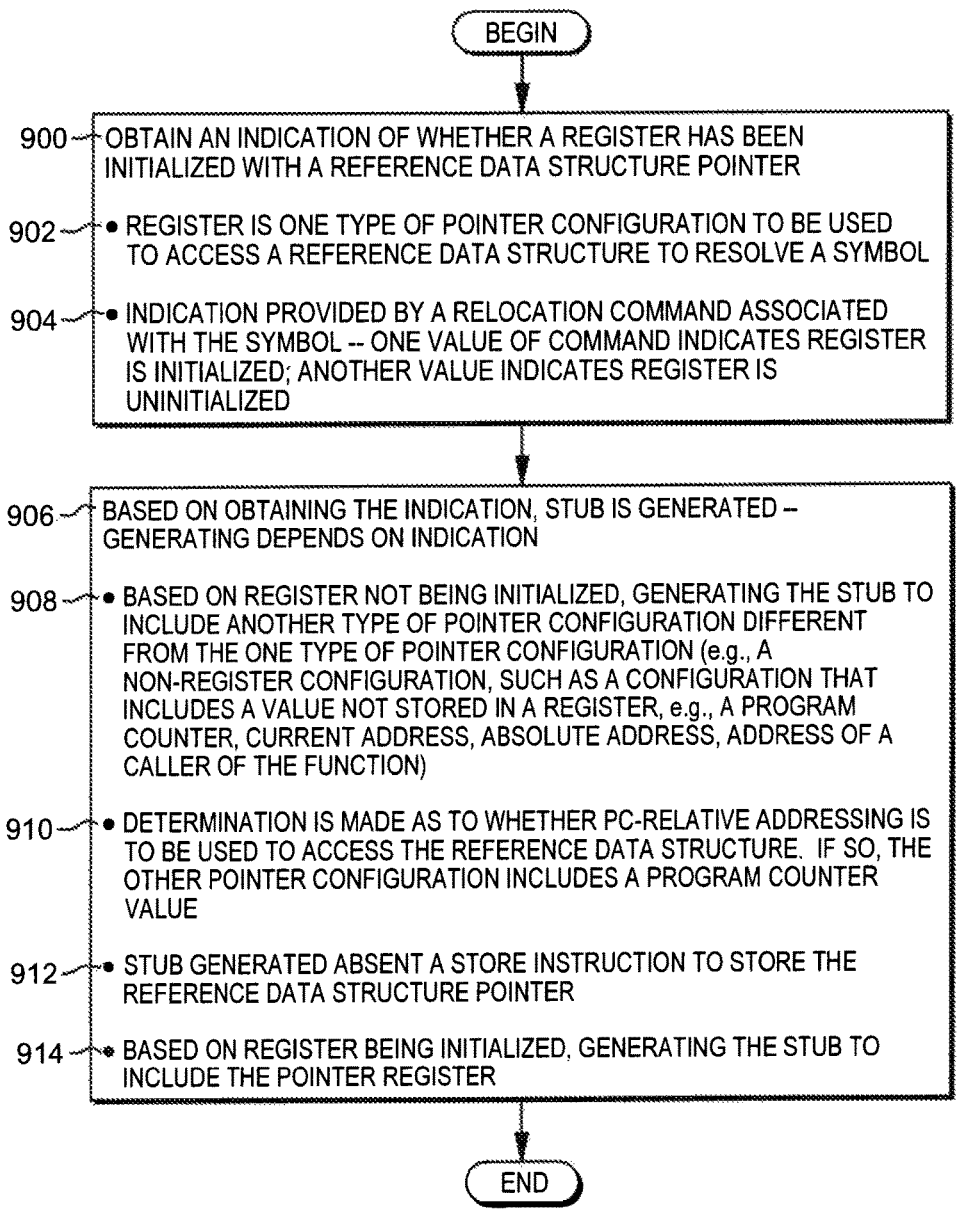
FIG. 9 depicts one example of logic associated with facilitating processing in a computing environment via use of initialization status of a reference data structure pointer register, in accordance with one or more aspects.

As described herein, processing is facilitated using initialization status of a reference data structure pointer register. Referring to FIG. 9, in one embodiment, an indication is obtained as to whether a register has been initialized with a reference data structure pointer, STEP 900. The register is one type of pointer configuration to be used to access a reference data structure to resolve a symbol, STEP 902. In one embodiment, the indication of whether the register is initialized is provided by a relocation command associated with the symbol, in which one value of the relocation command indicates the register is initialized, and another value of the relocation command indicates the register is uninitialized, STEP 904.

Based on obtaining the indication, a stub is generated, in which the generating depends on the indication, STEP 910. For instance, based on the register not being initialized, the stub is generated to include another type of pointer configuration different from the one type of pointer configuration (e.g., a non-register configuration, such as a configuration that includes a value not stored in a register to be used to access the reference data structure, e.g., a program counter, a current address, an absolute address, an address of a caller of the function, etc.), STEP 908.

In a further aspect, a determination is made as to whether pc-relative addressing is to be used to access the reference data structure, STEP 910. If pc-relative addressing is to be used, then the other pointer configuration includes a program counter value. In another embodiment, if absolute addressing is to be used, then the other pointer configuration includes an absolute address. In yet a further aspect, the stub is generated absent a store instruction to store the reference data structure pointer, STEP 912.

In yet a further embodiment, based on the register being initialized, the stub is generated to include the register, STEP 914.

Advantageously, computer performance is improved by selectively eliminating execution of one or more instructions and/or processing relating to a pointer register used to access a reference data structure, if that register is not initialized by a caller of the function to be resolved using the reference data structure. Advantageously, a capability is provided to generate a stub based on whether a pointer register is initialized. This improves performance and reduces costs associated with using the reference data structure.

In one aspect, as described herein, an indication of whether a register has been initialized with a reference data structure pointer is obtained. The register is one type of pointer configuration to be used to access a reference data structure to be used to resolve a symbol associated with a function of a program. Based on obtaining the indication, a stub is generated to be used to access the function. The generating depends on whether the indication indicates the register has been initialized. Based on the indication indicating the register has not been initialized, the generating includes generating the stub to include another type of pointer configuration to be used to access the reference data structure, the other type of pointer configuration being different from the one type of pointer configuration.

This advantageously enables a stub to be generated without relying on the register when the initialization status indicates the reference data structure pointer register has not been initialized. This improves performance within the computing environment by not requiring expensive initialization of the reference data structure pointer register and associated processing, if not needed.

In one embodiment, the other type of pointer configuration is a non-register pointer configuration. As an example, the other type of pointer configuration includes using a value, the value not being stored in a register to be used to access the reference data structure. The value includes one of a program counter, a current address, an absolute address, or an address of the program module calling the function. Again, this advantageously enables the stub to be generated without using the pointer register; thus, improving performance and reducing costs.

In one aspect, the generating the stub includes generating the stub absent a store instruction to store the reference data structure pointer. In another aspect, based on the indication indicating the register has not been initialized, a restoration of the register is avoided. This advantageously avoids executing instructions and performing processing that is unneeded and improves performance.

In one aspect, the indication of whether the register has been initialized is provided by a relocation command associated with the symbol to be resolved. As an example, one value of the relocation command indicates the register is initialized, and another value of the relocation command indicates the register is uninitialized. Advantageously, a new type of relocation command specifies whether the register is initialized, and allows processing to be performed based on the initialization status of the register.

In yet a further aspect, the generating the stub further includes determining whether pc-relative addressing is to be used to access the reference data structure; and based on determining pc-relative addressing is to be used to access the reference data structure, the other pointer configuration includes a program counter value to access the reference data structure. This is advantageous for those systems that use pc-relative addressing and may eliminate the need to perform processing associated with the pointer register that may not be needed.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 10:
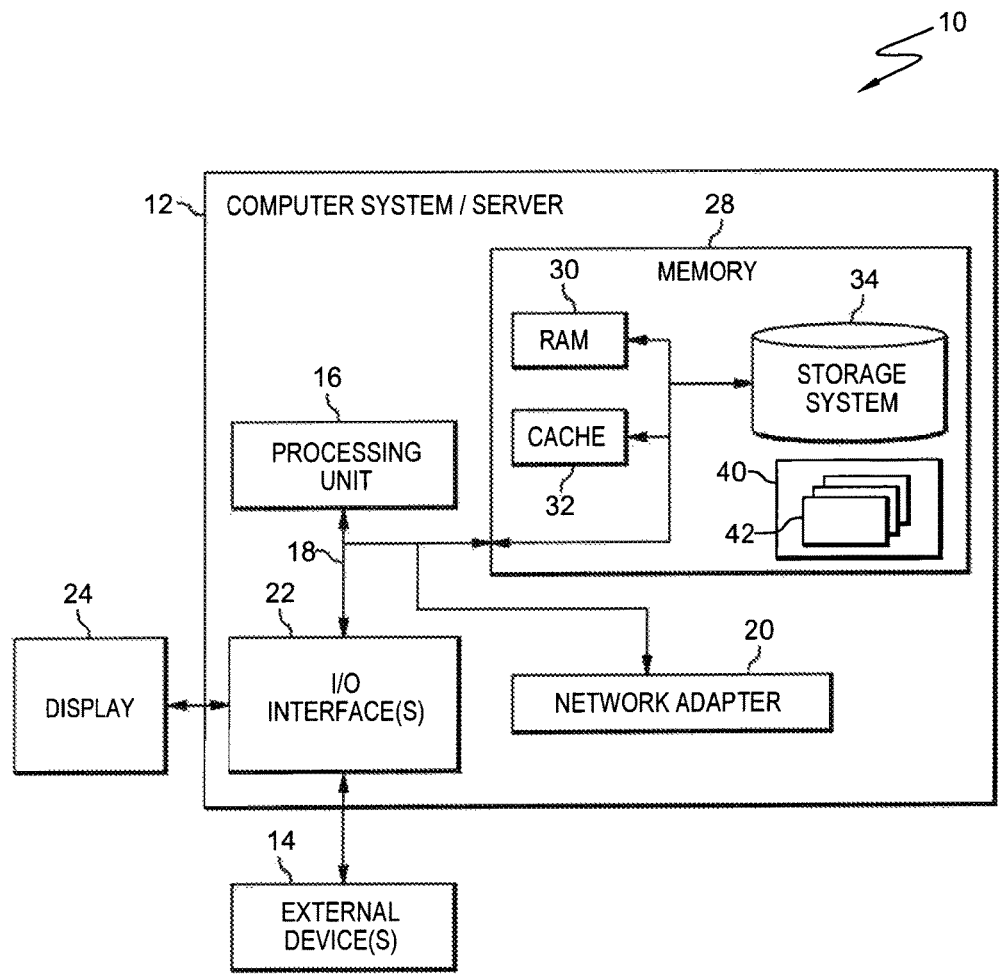
FIG. 10 depicts one example of a cloud computing node, in accordance with one or more aspects.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
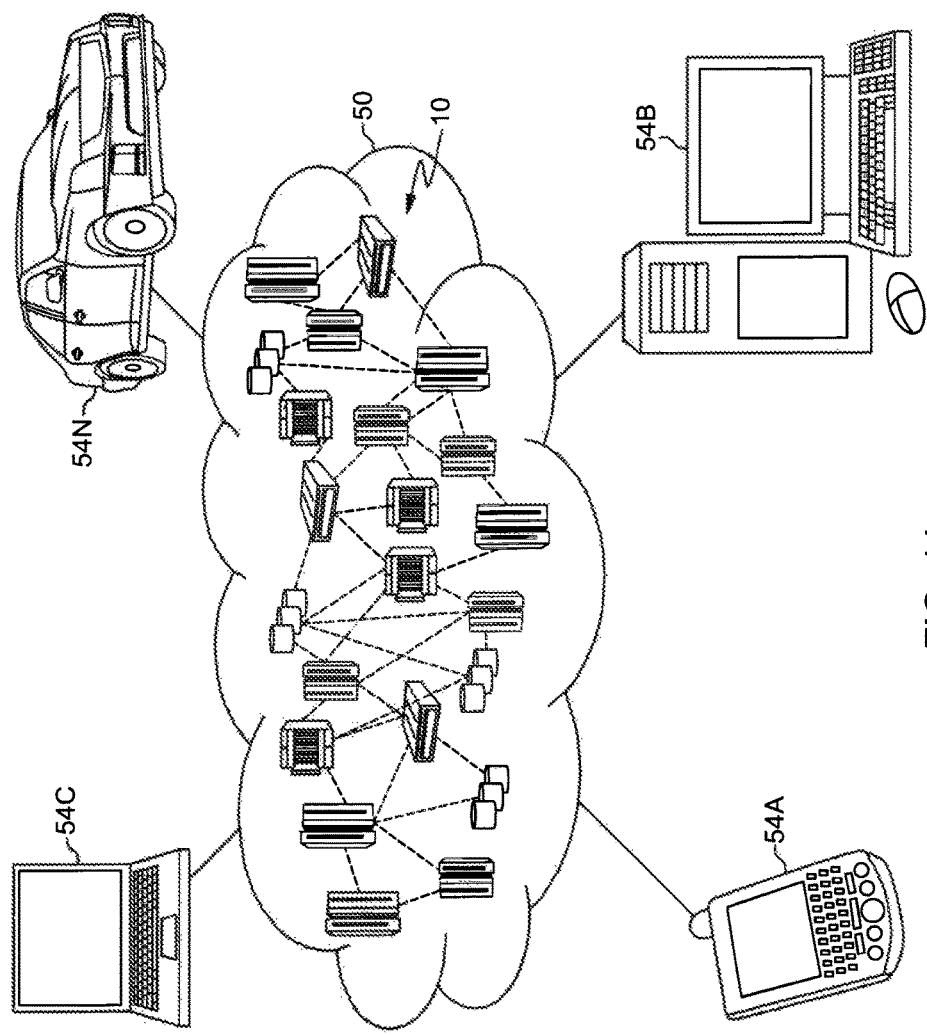
FIG. 11 depicts one embodiment of a cloud computing environment, in accordance with one or more aspects.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
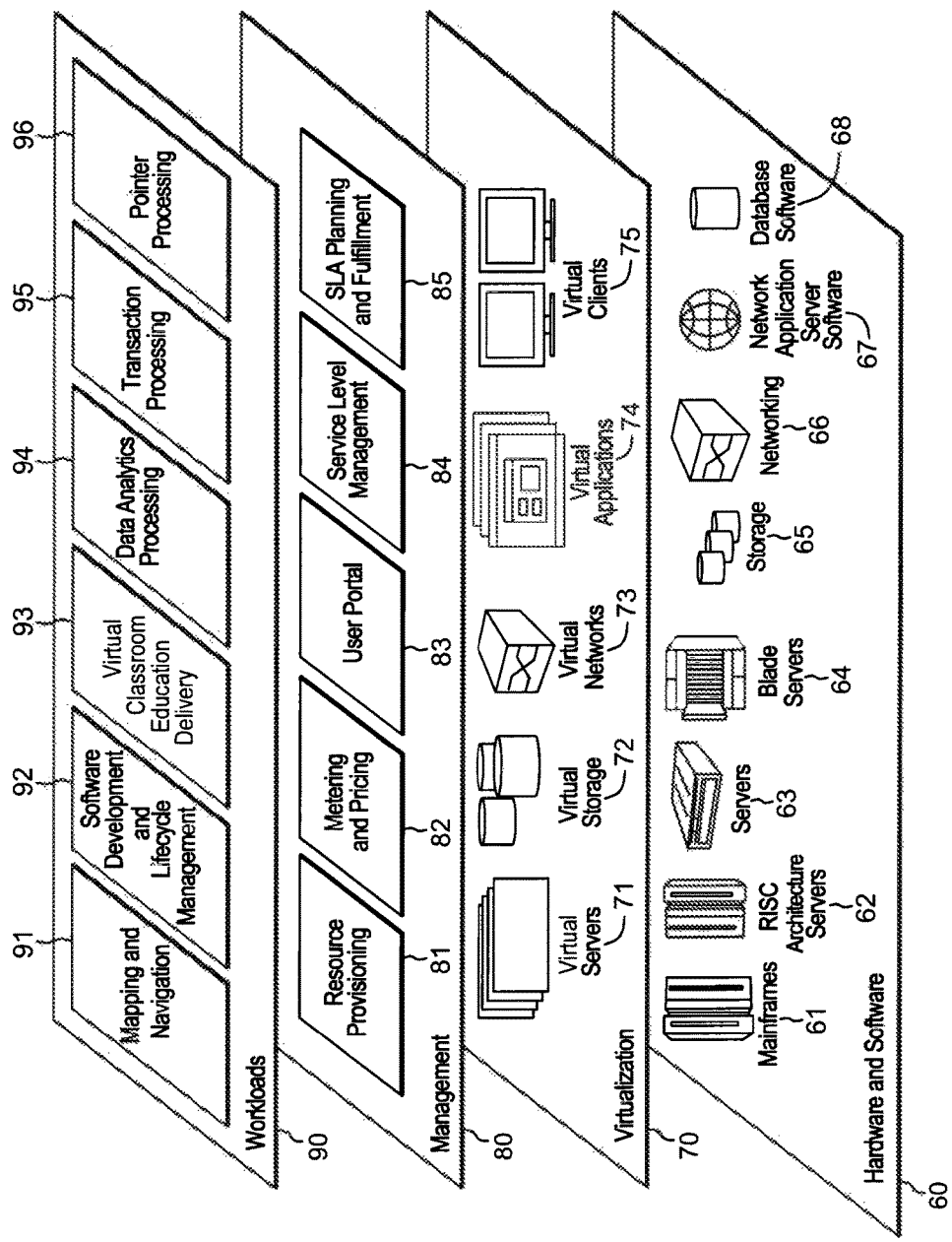
FIG. 12 depicts one example of abstraction model layers, in accordance with one or more aspects.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pointer processing of one or more aspects of the present invention 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different symbols and/or relocation commands may be used for the functions described herein, as well as for other functions. Additionally, other types of pointer configurations may be used, and/or other values. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
a non-transitory computer readable storage medium readable by a processing circuit and storing instructions for performing a method comprising:
obtaining, by a processor, initialization status of a register, the initialization status indicating whether the register has been initialized with a reference data structure pointer, the register being one type of pointer configuration to be used to access a reference data structure to be used to resolve a symbol associated with a function of a program, and wherein the initialization status is to be used in generating a stub to be used to access the function; and
based on obtaining the initialization status of the register, generating the stub to be used to access the function, the generating depending on whether the initialization status indicates the register has been initialized, wherein:
based on the initialization status indicating the register has been initialized with the reference data structure pointer, the generating the stub comprises generating the stub using the register; and
based on the initialization status indicating the register has not been initialized with the reference data structure pointer, the generating the stub comprises generating the stub to include another type of pointer configuration to be used to access the reference data structure, the other type of pointer configuration being different from the one type of pointer configuration in that the stub is generated without referencing the register in the stub.

2. The computer program product of claim 1, wherein the other type of pointer configuration is a non-register pointer configuration.

3. The computer program product of claim 1, wherein the other type of pointer configuration includes using a value, the value not being stored in the register to be used to access the reference data structure, and wherein the value comprises one of a program counter, a current address, an absolute address, or an address of a caller of the function.

4. The computer program product of claim 1, wherein the generating the stub, based on the initialization status indicating the register has not been initialized with the reference data structure pointer, comprises generating the stub absent a store instruction to store the reference data structure pointer.

5. The computer program product of claim 1, wherein based on the initialization status indicating the register has not been initialized, a restoration of the register is avoided.

6. The computer program product of claim 1, wherein the initialization status indicating whether the register has been initialized is provided by a relocation command associated with the symbol to be resolved.

7. The computer program product of claim 6, wherein one value of the relocation command indicates the register is initialized, and another value of the relocation command indicates the register is uninitialized.

8. A computer system for facilitating processing within a computing environment, said computer system comprising:
   a memory; and
   a processor in communications with the memory, wherein the computer system is configured to perform a method, the method comprising:
      obtaining, by the processor, initialization status of a register, the initialization status indicating whether the register has been initialized with a reference data structure pointer, the register being one type of pointer configuration to be used to access a reference data structure to be used to resolve a symbol associated with a function of a program, and wherein the initialization status is to be used in generating a stub to be used to access the function, and
      based on obtaining the initialization status of the register, generating the stub to be used to access the function, the generating depending on whether the initialization status indicates the register has been initialized, wherein:
         based on the initialization status indicating the register has been initialized with the reference data structure pointer, the generating the stub comprises generating the stub using the register; and
         based on the initialization status indicating the register has not been initialized with the reference data structure pointer, the generating the stub comprises generating the stub to include another type of pointer configuration to be used to access the reference data structure, the other type of pointer configuration being different from the one type of pointer configuration in that the stub is generated without referencing the register in the stub.

9. The computer system of claim 8, wherein the other type of pointer configuration is a non-register pointer configuration.

10. The computer system of claim 8, wherein the other type of pointer configuration includes using a value, the value not being stored in the register to be used to access the reference data structure, and wherein the value comprises one of a program counter, a current address, an absolute address, or an address of a caller of the function.

11. The computer system of claim 8, wherein the initialization status indicating whether the register has been initialized is provided by a relocation command associated with the symbol to be resolved.

12. The computer system of claim 8, wherein the generating the stub, based on the initialization status indicating the register has not been initialized with the reference data structure pointer, comprises generating the stub absent a store instruction to store the reference data structure pointer.

13. The computer system of claim 8, wherein based on the initialization status indicating the register has not been initialized, a restoration of the register is avoided.

14. The computer system of claim 11, wherein one value of the relocation command indicates the register is initialized, and another value of the relocation command indicates the register is uninitialized.

15. A computer-implemented method of facilitating processing within a computing environment, said computer-implemented method comprising:
   obtaining, by a processor, initialization status of a register, the initialization status indicating whether the register has been initialized with a reference data structure pointer, the register being one type of pointer configuration to be used to access a reference data structure to be used to resolve a symbol associated with a function of a program, and wherein the initialization status is to be used in generating a stub to be used to access the function, and
   based on obtaining the initialization status of the register, generating the stub to be used to access the function, the generating depending on whether the initialization status indicates the register has been initialized, wherein:
      based on the initialization status indicating the register has been initialized with the reference data structure pointer, the generating the stub comprises generating the stub using the register; and
      based on the initialization status indicating the register has not been initialized with the reference data structure pointer, the generating the stub comprises generating the stub to include another type of pointer configuration to be used to access the reference data structure, the other type of pointer configuration being different from the one type of pointer configuration in that the stub is generated without referencing the register in the stub.

16. The computer-implemented method of claim 15, wherein the other type of pointer configuration is a non-register pointer configuration.

17. The computer-implemented method of claim 15, wherein the other type of pointer configuration includes using a value, the value not being stored in the register to be used to access the reference data structure, and wherein the value comprises one of a program counter, a current address, an absolute address, or an address of a caller of the function.

18. The computer-implemented method of claim 15, wherein the generating the stub, based on the initialization status indicating the register has not been initialized with the reference data structure pointer, comprises generating the stub absent a store instruction to store the reference data structure pointer.

19. The computer-implemented method of claim 15, wherein the initialization status indicating whether the register has been initialized is provided by a relocation command associated with the symbol to be resolved.

20. The computer-implemented method of claim 15, wherein based on the initialization status indicating the register has not been initialized, a restoration of the register is avoided.

* * * * *